(12) United States Patent
Mochizuki (10) Patent No.: US 10,300,835 B2
(45) Date of Patent: May 28, 2019

(54) VEHICLE LAMP

(71) Applicant: Koito Manufacturing Co., Ltd., Tokyo (JP)

(72) Inventor: Mai Mochizuki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 22 days.

(21) Appl. No.: 15/585,611

(22) Filed: May 3, 2017

(65) Prior Publication Data

US 2017/0336041 A1 Nov. 23, 2017

(30) Foreign Application Priority Data

May 17, 2016 (JP) ................ 2016-098793

(51) Int. Cl.
| | |
|---|---|
| *B60Q 1/00* | (2006.01) |
| *B60Q 1/26* | (2006.01) |
| *B60Q 1/32* | (2006.01) |
| *B60Q 1/34* | (2006.01) |
| *B60Q 1/44* | (2006.01) |
| *F21V 8/00* | (2006.01) |
| *F21S 41/24* | (2018.01) |
| *F21S 41/141* | (2018.01) |

(52) U.S. Cl.
CPC .......... *B60Q 1/0011* (2013.01); *B60Q 1/2696* (2013.01); *B60Q 1/32* (2013.01); *B60Q 1/34* (2013.01); *B60Q 1/44* (2013.01); *F21S 41/141* (2018.01); *F21S 41/24* (2018.01); *G02B 6/0016* (2013.01); *G02B 6/0078* (2013.01)

(58) Field of Classification Search
CPC ...... B60Q 1/0011; B60Q 1/2696; B60Q 1/32; B60Q 1/34; B60Q 1/44; F21S 41/141; F21S 41/24; F21S 48/1241; G02B 6/0016; G02B 6/0078
See application file for complete search history.

(56) References Cited

U.S. PATENT DOCUMENTS

2013/0021815 A1* 1/2013 Koizumi ............... F21S 48/215
362/511

FOREIGN PATENT DOCUMENTS

| JP | 2014-167879 A | 9/2014 |
| JP | 2016194983 A | * 11/2016 |

* cited by examiner

*Primary Examiner* — Nimeshkumar D Patel
*Assistant Examiner* — Jacob R Stern
(74) *Attorney, Agent, or Firm* — Abelman, Frayne & Schwab (57) ABSTRACT

Provided is a vehicle lamp including: a light source; and a light guide extending in a predetermined extension direction and configured to guide therethrough a light from the light source such that the light is incident from a rear surface and emitted from a front surface. The light guide includes a guide element including a front incident surface formed in a portion of the rear surface facing the light source; a side incident surface formed on a side of the front incident surface on the rear surface, and a reflecting surface formed on a side of the side incident surface on the rear surface and configured to totally reflect the light incident from the side incident surface toward the front surface. A joint portion between the front incident surface and the side incident surface is formed as a curved surface.

11 Claims, 7 Drawing Sheets

VEHICLE LAMP

CROSS-REFERENCE TO RELATED APPLICATIONS

This application is based on and claims priority from Japanese Patent Application No. 2016-098793, filed on May 17, 2016 with the Japan Patent Office, the disclosure of which is incorporated herein in its entirety by reference.

TECHNICAL FIELD

The present disclosure relates to a vehicle lamp. Particularly, the present disclosure relates to a vehicle lamp using a light-emitting element and a plate-shaped light guide.

BACKGROUND

Conventionally, there has been suggested a vehicular lamp having a combination of a light source (e.g., an LED) and a plate-shaped light guide for controlling light from the light source. The light emitted from the light source is incident on the light guide. The light incident on the light guide is, for example, reflected, refracted, and scattered by components of the light guide such as, for example, an incident surface and a reflecting surface, and is emitted from a predetermined emitting surface. As a result, it seems to a person who is outside the vehicle that the entire light guide is emitting light. See, e.g., Japanese Patent Laid-Open Publication No. 2014-167879.

SUMMARY

In the vehicular lamp using the light guide as described above, it is desirable that the light is irradiated not only to the front direction of the lamp but also to the side of the lamp.

The present disclosure has been made in consideration of such a circumstance, and an object of the present disclosure is to provide a vehicle lamp capable of irradiating light to the side of the lamp in addition to the front direction of the lamp.

In order to solve the above-described problem, according to an aspect, the present disclosure provides a vehicle lamp; and a light guide extending in a predetermined extension direction and configured to guide therethrough light from the light source such that the light is incident from a rear surface and emitted from a front surface. The light guide includes a guide element including a front incident surface formed in a portion of the rear surface facing the light source; a side incident surface formed on a side of the front incident surface on the rear surface, and a reflecting surface formed on a side of the side incident surface on the rear surface and configured to totally reflect the light incident from the side incident surface toward the front surface. A joint portion between the front incident surface and the side incident surface is formed as a curved surface.

The light guide may include a first light guide element and a second light guide element which are disposed adjacent to each other. The first light guide element is positioned in front of the second light guide element. The first light guide element may include a joint portion formed as a curved surface between a front incident surface and a side incident surface at the second light guide element side.

A side incident surface of the second light guide element at the first light guide element side and a reflecting surface may be connected via a connecting surface, and the connecting surface may be substantially parallel to a longitudinal direction of the vehicle lamp.

An area of one reflecting surface of the first light guide element at the second light guiding element side may be smaller than an area of the other reflecting surface thereof positioned opposite to the one reflecting surface via the front incident surface of the first light guide element.

A curvature of the curved surface may be 0.5 to 4.0.

The front incident surface may have a stepped portion protruding rearward at a portion corresponding to an end portion of an insert of a mold used for forming the front incident surface.

According to the present disclosure, it is possible to provide a vehicle lamp capable of irradiating light to the side of the lamp in addition to the front direction of the lamp.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

A vehicle lamp according to an exemplary embodiment of the present disclosure will be described in detail with reference to the drawings. In the present specification, the terms representing directions such as, for example, "upper," "lower," "front," "rear," "left," "right," "inner," and "outer" as used here mean directions in a posture when the vehicle lamp is mounted on the vehicle.

Figure 1:
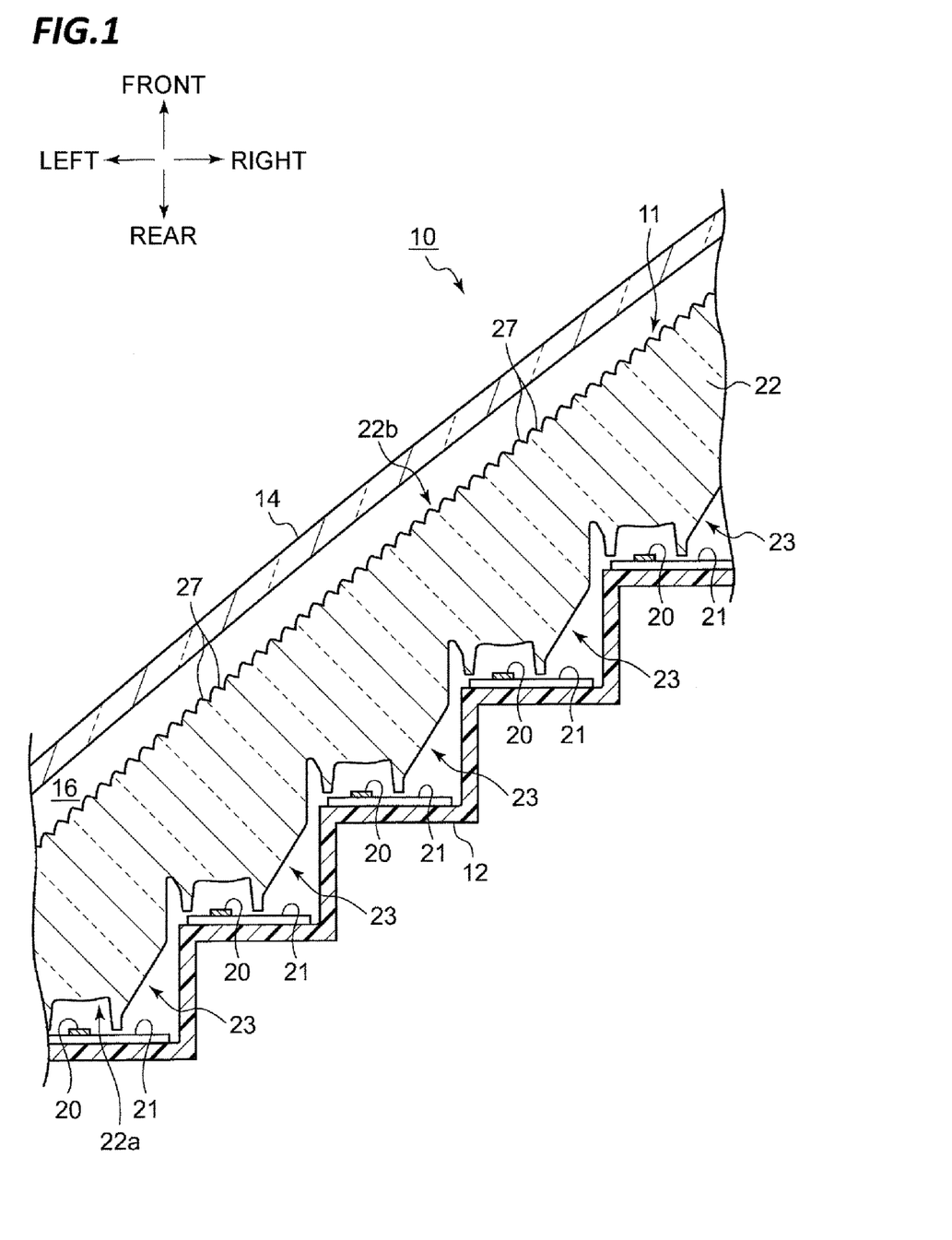
FIG. 1 is a schematic horizontal cross-sectional view of a part of a vehicle lamp according to an exemplary embodiment of the present disclosure.

FIG. 1 is a schematic horizontal-sectional view of a part of a vehicle lamp 10 according to an exemplary embodiment of the present disclosure. The vehicle lamp 10 may be used, for example, as a turn signal lamp, a clearance lamp, or a daytime running lamp mounted on a front portion of a vehicle. Further, the vehicle lamp 10 may also be used as a marker lamp in the rear portion of the vehicle, for example, a turn signal lamp, a tail lamp, or a stop lamp.

As illustrated in FIG. 1, the vehicle lamp 10 includes a lamp body 12 and a transparent cover 14 that covers a front surface opening of the lamp body 12. The lamp body 12 and the cover 14 form a lamp chamber 16. The cover 14 is inclined backward from the right side of the vehicle to the left side following the shape of the vehicle. A lamp unit 11 is accommodated in the lamp chamber 16.

Figure 2:
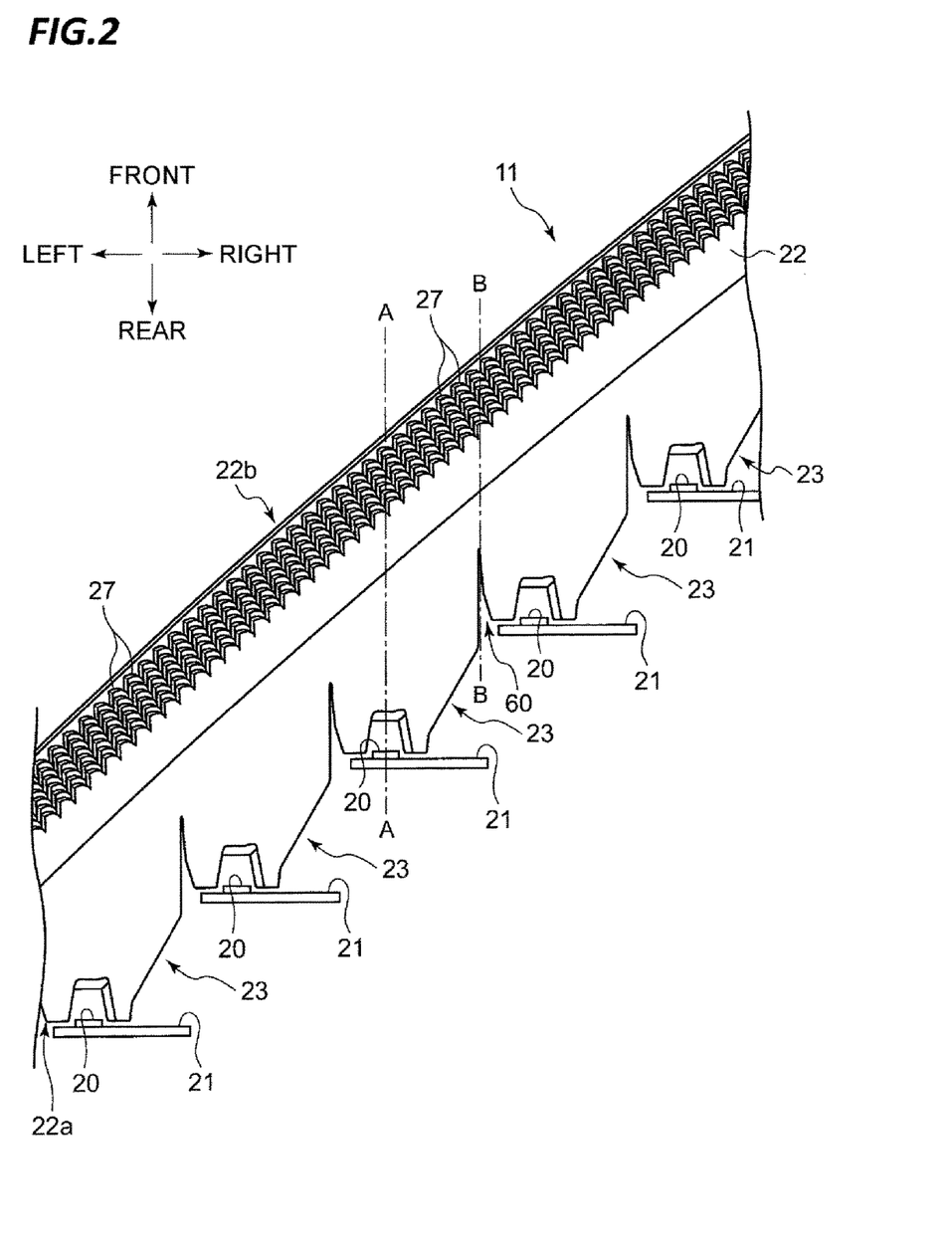
FIG. 2 is a plan view of a lamp unit.
Figure 3:
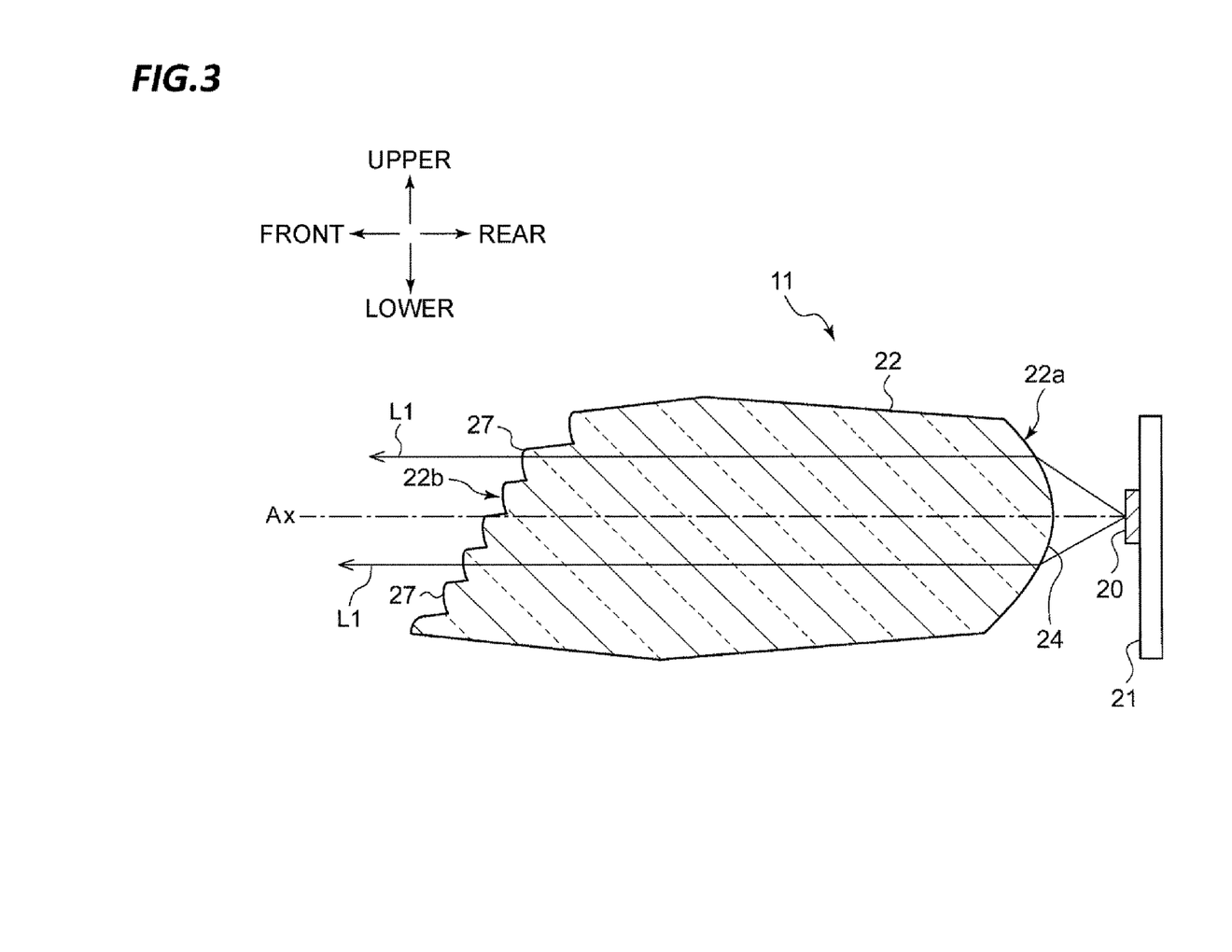
FIG. 3 is a cross-sectional view taken along the line A-A of the lamp unit illustrated in FIG. 2.

FIG. 2 is a plan view of a lamp unit 11. FIG. 3 is a cross-sectional view taken along the line A-A of the lamp unit 11 illustrated in FIG. 2 (vertical cross-sectional view).

As illustrated in FIGS. 1 to 3, the lamp unit 11 includes a plurality of LEDs 20, substrates 21 on which the LEDs 20 are mounted, and a plate-shaped light guide 22 positioned in front of the LEDs 20.

Each LED 20 is disposed on a substrate 21 so that its light emitting surface faces the front of the lamp, that is, an optical axis Ax thereof is parallel to the front and rear direction of the lamp. As illustrated in FIG. 1, the substrate 21 is disposed on the bottom surface of the lamp body 12 and supplies current to the LED 20.

The light guide 22 extends in a predetermined extension direction, and is configured to guide therethrough light from the LED 20 such that the light is incident from a rear surface 22a and emitted from a front surface 22b. The light guide 22 is formed by extrusion-molding a transparent resin such as, for example, acrylic. The light guide 22 includes a plurality of integrally formed light guide elements 23. The light guide elements 23 are arranged adjacent to each other in a direction inclined rearward from the right side to the left side following the shape of the cover 14. The light guide elements 23 have the same shape, and one LED 20 is arranged for each light guide element 23. Each light guide element 23 is connected to the adjacent light guide element 23.

Figure 4:
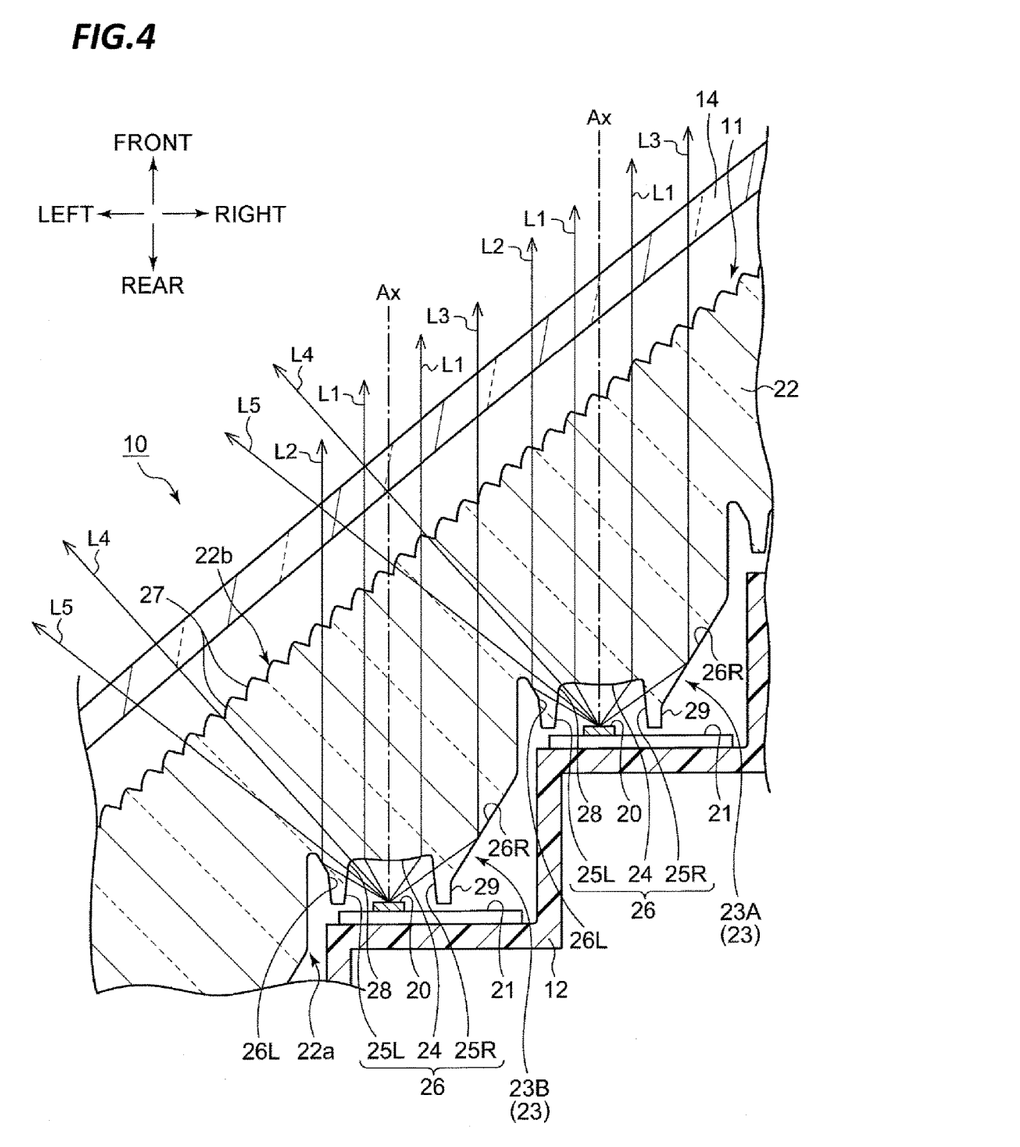
FIG. 4 is an enlarged view of the main part of the vehicle lamp.

FIG. 4 is an enlarged view of the main part of the vehicle lamp 10. The configuration of the light guide 22 will be described in detail with reference to FIG. 4.

In FIG. 4, two light guide elements 23 of the light guide 22 are illustrated. Here, the right light guide element is referred to as a first light guide element 23A, and the left light guide element is referred to as a second light guide element 23B. The first light guide element 23A and the second light guide element 23B are disposed adjacent to each other. As illustrated in FIG. 4, the first light guide element 23A is positioned in front of the second light guide element 23B.

The rear surface 22a of each light guide element 23 is provided with an incident portion 26 for allowing light from the LED 20 to be incident on the inside of the light guide element. The incident portion 26 includes a front incident surface 24, a left side incident surface 25L, and a right side incident surface 25R.

The front incident surface 24 is formed in a portion of the rear surface 22a facing the LED 20. The front incident surface 24 is positioned on an optical axis Ax of the LED 20. Light having a relatively small emission angle among the light emitted from the LED 20 is incident on the front incident surface 24. The front incident surface 24 is formed in a convex curve shape in its horizontal cross-section and vertical cross-section. Light incident on the light guide element from the front incident surface 24 is refracted at the front incident surface 24. Then, the light travels through the light guide element toward the front surface 22b and is emitted from the front surface 22b (see the light ray L1 in FIGS. 3 and 4).

The left side incident surface 25L is formed on the left side of the front incident surface 24 on the rear surface 22a. The right side incident surface 25R is formed on the right side of the front incident surface 24 on the rear surface 22a. Light having a relatively large emission angle among the light emitted from the LED 20 is incident on the right side incident surface 25R and the left side incident surface 25L.

A left reflecting surface 26L is formed on the left side of the left side incident surface 25L of each light guide element 23 to totally reflect (internally reflect) the light incident on the light guide element from the left side incident surface 25L toward the front surface 22b. The light totally reflected by the left reflecting surface 26L passes through the light guide element and is emitted from the front surface 22b toward the front of the lamp (see the light ray L2 in FIG. 4).

A right reflecting surface 26R is formed on the right side of the right side incident surface 25R of each light guide element 23 to totally reflect (internally reflect) the light incident on the light guide element from the right side incident surface 25L toward the front surface 22b. The light totally reflected by the right reflecting surface 26R passes through the light guide element and is emitted from the front surface 22b toward the front of the lamp (see the light ray L3 in FIG. 4).

As illustrated in FIGS. 1 to 4, a plurality of steps 27 may be formed on the front surface 22b of the light guide 22 to diffuse the emitted light.

As illustrated in FIG. 4, in the vehicle lamp 10 according to the exemplary embodiment, a joint portion 28 between the front incident surface 24 and one side incident surface is formed as a curved surface. Descriptions will be made on the relationship between the adjacent first and second light guide elements 23A and 23B. In the first light guide element 23A positioned in front of the second light guide element 23B, the joint portion 28 between the front light incident surface 24 and the side incident surface at the second light guide element 23B side (here, the left side incident surface 25L) is formed as a curved surface. A curvature of the curved surface of the joint portion 28 may be 0.5 to 4.0.

In the vehicle lamp 10 according to the exemplary embodiment, since the joint portion 28 is formed as a curved surface as described above, the light incident on the joint portion 28 from the LED 20 and passing through the light guiding element may be emitted from the front surface 22b toward the side of the lamp (see the light ray L4 in FIG. 4). Since light is irradiated not only in the front direction of the lamp but also in the side of the lamp, it is possible to realize a vehicle lamp with an enhanced side visibility.

In the vehicular lamp 10 according to the exemplary embodiment, the area of one reflecting surface (here, the left reflecting surface 26L) of the first light guiding element 23A on the second light guiding element 23B side is smaller than the area of the other reflecting surface (here, the right reflecting surface 26R) of the reflecting surface 23A positioned opposite to the one reflecting surface via the front incident surface 24 of the first light guide element. With such a configuration, it is difficult for the light incident on the joint portion 28 from the LED 20 to be incident on one reflecting surface (the left reflecting surface 26L). Thus, it is possible to increase the light emitted from the front surface 22b to the side of the lamp (see the light ray L5 in FIG. 4). It should be noted that the light ray L5 in FIG. 4 is totally reflected by the left reflecting surface 26L and emitted in the front direction of the lamp when the left reflecting surface 26L is of the same size as the right reflecting surface 26R.

Further, in the vehicle lamp 10 according to the exemplary embodiment, the side incident surface (here, the right side incident surface 25R) of the second light guide element 23B on the first light guide element 23A side and the reflecting surface (here, the right reflecting surface 26R) are connected via a connecting surface 29. The connecting surface 29 is substantially parallel to the front and rear direction of the vehicle lamp 10. In this way, when the connecting surface 29 is provided to connect the right side incident surface 25R and the right reflecting surface 26R, the distance between adjacent light guide elements may be reduced, as compared with a case where the right side incident surface 25R and the right reflecting surface 26R are directly connected to each other. When the distance between the adjacent light guide elements is large, the gap between the light guide elements tends to be dark. However, the uniform light emission property may be enhanced by reducing the distance between the adjacent light guide elements as in the exemplary embodiment.

Figure 5:
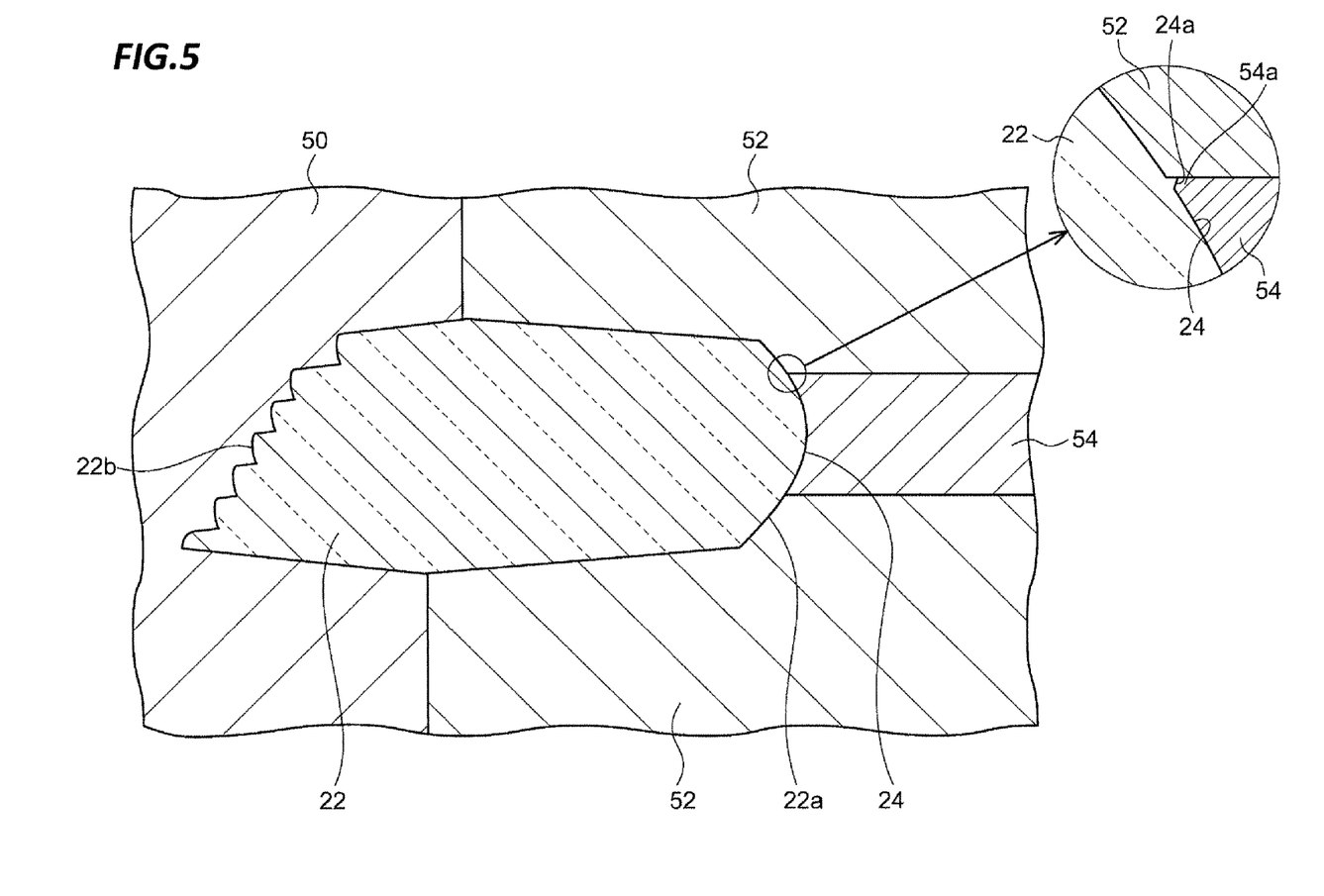
FIG. 5 is a view illustrating formation of a light guide with a mold.

FIG. 5 illustrates formation of the light guide 22 with a mold. As illustrated in FIG. 5, the light guide 22 is formed by using a cavity side mold 50, a core side mold 52, and an insert 54. The insert 54 is used to form the front incident surface 24 of the light guide 22. In order to satisfy the optical characteristics required for the lamp, the front incident surface 24 is required to have high processing accuracy. The processing accuracy of the front incident surface 24 may be enhanced by forming the insert 54 using a high quality mold material.

When the light guide 22 is formed, a transparent resin (e.g., acrylic) is first injected into the cavity formed when the cavity side mold 50, the core side mold 52, and the insert 54 are combined. After the transparent resin injected into the cavity is cooled and solidified, the cavity side mold 50 is separated from the core side mold 52, so that the light guide 22 sticks to the core side mold 52. Thereafter, the light guide 22 may be removed from the core side mold 52 by protruding the insert 54.

In FIG. 5, the periphery of the end portion of the insert 54 is illustrated in an enlarged scale. As illustrated in the enlarged view of FIG. 5, the front incident surface 24 of the light guide 22 has a stepped portion 24a protruding rearward in a portion corresponding to the end portion 54a of the insert 54. When the front incident surface 24 does not have such a step portion 24a, the end portion 54a of the insert 54 becomes extremely thin. Thus, the strength of the insert 54 may decrease thereby causing an occurrence of cracking or chipping in the end portion 54a. In the case where the front incident surface 24 has the step portion 24a as in the exemplary embodiment, it is possible to avoid thinning of the end portion Ma of the insert 54. Thus, the strength of the insert 54 may be enhanced. It is desirable that the size and shape of the end portion 54a be designed so as to minimize the influence on the optical characteristics.

Figure 6:
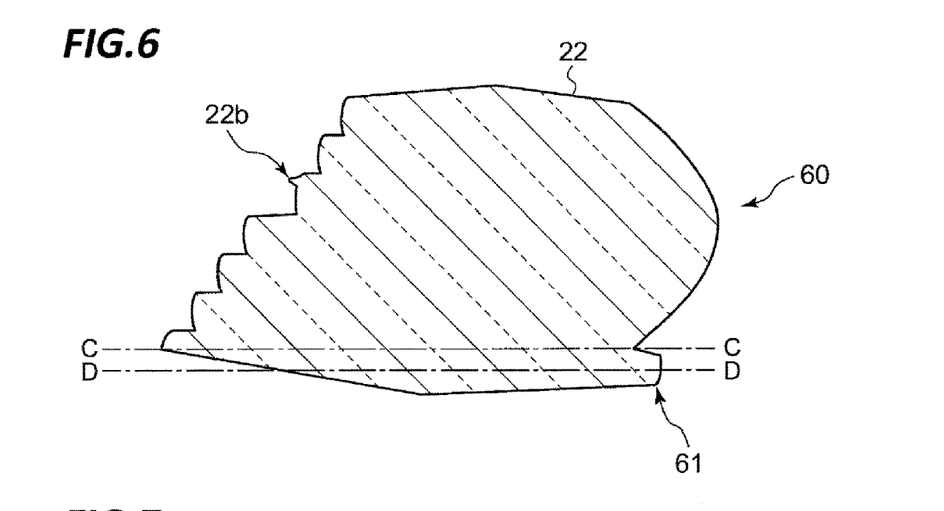
FIG. 6 is a cross-sectional view taken along the line B-B of the light guide illustrated in FIG. 2.
Figure 7:
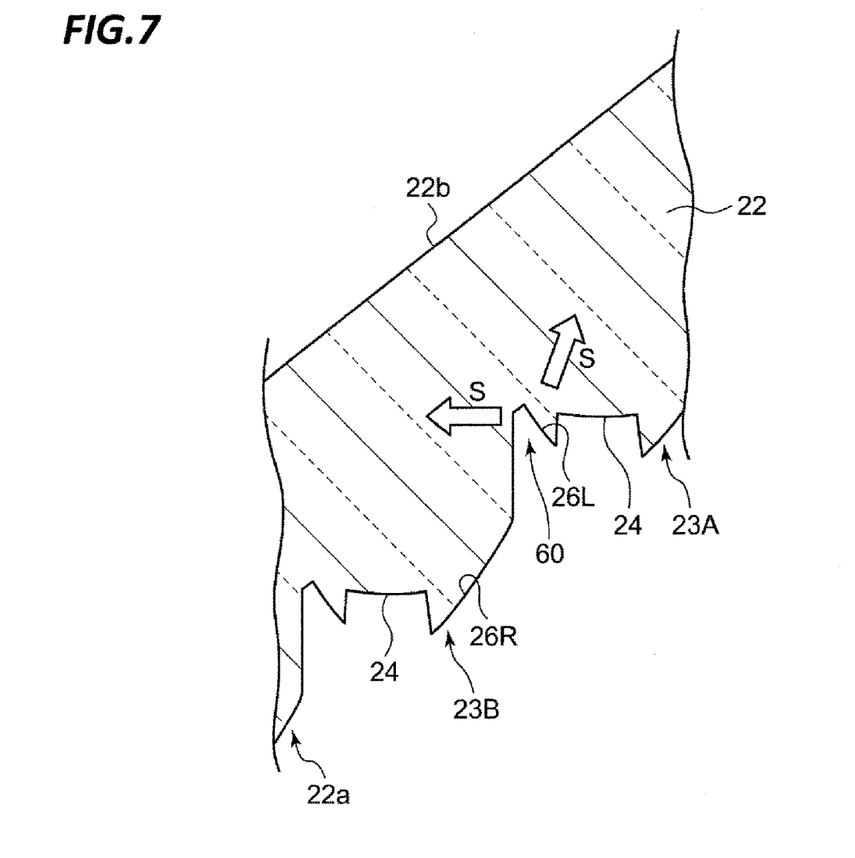
FIG. 7 is a cross-sectional view taken along the line C-C of the light guide illustrated in FIG. 6.
Figure 8:
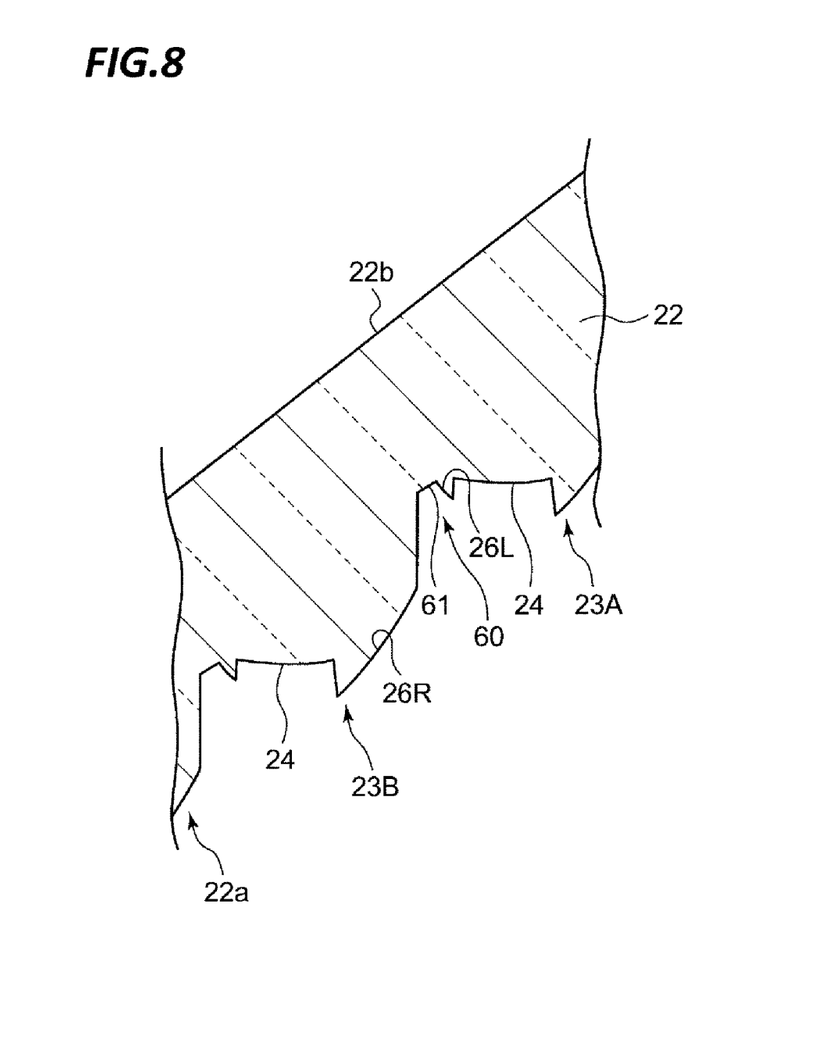
FIG. 8 is a cross-sectional view taken along the line D-D of the light guide illustrated in FIG. 6.

FIG. 6 is a cross-sectional view taken along the line B-B of the light guide 22 illustrated in FIG. 2 (vertical cross-sectional view). FIG. 7 is a cross-sectional view taken along the line C-C of the light guide 22 illustrated in FIG. 6 (horizontal cross-sectional view). FIG. 8 is a cross-sectional view taken along the line D-D of the light guide 22 illustrated in FIG. 6 (horizontal cross-sectional view).

On the rear surface 22a of the light guide 22 according to the exemplary embodiment, a sharp groove 60 is formed between two adjacent light guide elements 23 (the right light guide element is referred to as a first light guide element 23A and the left light guide element is referred to as a second light guide element 23B in the same manner as described above). FIG. 6 is a vertical cross-sectional view of a portion of the groove 60. The groove 60 forms a part of the left reflecting surface 26L of the first light guide element 23A and a part of the right reflecting surface 26R of the second light guide element 23B.

As illustrated in FIG. 6, a stepped portion 61 protruding rearward is formed at the lower end of the groove 60. As illustrated in FIG. 8, the stepped portion 61 is formed so as to bridge the left reflecting surface 26L of the first light guide element 23A and the right reflecting surface 26R of the second light guide element 23B. Comparing FIG. 7 which illustrates a cross-section of the part removed from the stepped portion 61 and FIG. 8 which illustrates a cross-section of the stepped portion 61, the groove 60 illustrated in FIG. 8 is shallower than the groove 60 illustrated in FIG. 7 due to the presence of the stepped portion 61.

The stepped portion 61 is formed for the purpose of preventing the distortion of the left reflecting surface 26L of the first light guide element 23A and the right reflecting surface 26R of the second light guide element 23B to enhance the optical characteristics. As described above, the light guide 22 is formed by injecting a transparent resin into the cavity formed by the mold, and then, cooling and solidifying the transparent resin. Here, when the transparent resin is cooled and solidified, the solidification starts from the portion of the light guide 22 close to the mold (i.e., the peripheral portion of the light guide 22), so that the portion of the light guide 22 away from the mold (i.e., the central portion of the light body 22) is solidified late. When the transparent resin is solidified from a liquid to a solid, the transparent resin shrinks. Thus, when the central portion of the light guide 22 is solidified late, stress is generated from the peripheral portion of the light guide 22 toward the central portion. FIG. 7 illustrates an image of a stress S generated around the groove 60. The stress S generated around the groove 60 is generated so as to widen the width of the groove 60. Due to this stress S, the left reflecting surface 26L of the first light guide element 23A and the right reflecting surface 26R of the second light guide element 23B may be distorted so that desired optical characteristics may not satisfied.

In the light guide 22 according to the exemplary embodiment, since the stepped portion 61 is formed to bridge the left reflecting surface 26L of the first light guide element 23A and the right reflecting surface 26R of the second light guide element 23B, it is possible to prevent or at least suppress the distortion of the reflecting surfaces due to the stress S generated around the groove 60. Thus, desired optical characteristics may be achieved.

For example, in the above-described exemplary embodiment, the light source was exemplified by an LED. However, the light source is not limited to the LED, but may be, for example, an LD (laser diode) or an organic EL.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A vehicle lamp comprising:
a light source; and
a light guide extending in a predetermined extension direction and configured to guide therethrough light from the light source such that the light is incident from a rear surface and emitted from a front surface;
wherein the light guide includes a guide element including a front incident surface formed in a portion of the rear surface facing the light source; a side incident surface formed on a side of the front incident surface on the rear surface; and a reflecting surface formed on a side of the side incident surface on the rear surface and configured to totally reflect the light incident from the side incident surface through the light guiding element and is emitted from the front surface toward a front of the vehicle lamp, and a joint portion between the front incident surface and the side incident surface is formed as a curved surface, and light incident on the joint portion passes through the light guiding element and is emitted from the front surface toward a side of the vehicle lamp, without bending, such that the emitted light enhances side visibility of the vehicle lamp.

2. The vehicle lamp of claim 1, wherein the light guide includes a first light guide element and a second light guide element which are disposed adjacent to each other, the first light guide element is positioned in front of the second light guide element, and the first light guide element includes a joint portion formed as a curved surface between a front incident surface and a side incident surface at the second light guide element side.

3. The vehicle lamp of claim 2, wherein a side incident surface of the second light guide element at the first light guide element side and a reflecting surface are connected via a connecting surface, and the connecting surface is substantially parallel to a longitudinal direction of the vehicle lamp.

4. The vehicle lamp of claim 2, wherein an area of one reflecting surface of the first light guide element at the second light guiding element side is smaller than an area of the other reflecting surface thereof positioned opposite to the one reflecting surface via the front incident surface of the first light guide element.

5. The vehicle lamp of claim 3, wherein an area of one reflecting surface of the first light guide element at the second light guiding element side is smaller than an area of the other reflecting surface thereof positioned opposite to the one reflecting surface via the front incident surface of the first light guide element.

6. The vehicle lamp of claim 1, wherein a curvature of the curved surface is 0.5 to 4.0.

7. The vehicle lamp of claim 2, wherein a curvature of the curved surface is 0.5 to 4.0.

8. The vehicle lamp of claim 3, wherein a curvature of the curved surface is 0.5 to 4.0.

9. The vehicle lamp of claim 4, wherein a curvature of the curved surface is 0.5 to 4.0.

10. The vehicle lamp of claim 5, wherein a curvature of the curved surface is 0.5 to 4.0.

11. The vehicle lamp of claim 1, wherein the front incident surface has a stepped portion protruding rearward at a portion corresponding to an end portion of an insert of a mold used for forming the front incident surface.

* * * * *